US008547352B2

(12) United States Patent
Park et al.

(10) Patent No.: US 8,547,352 B2
(45) Date of Patent: Oct. 1, 2013

(54) METHOD, APPARATUS FOR SENSING MOVED TOUCH AND COMPUTER READABLE RECORD-MEDIUM ON WHICH PROGRAM FOR EXECUTING METHOD THEREOF

(75) Inventors: Young-Un Park, Seongnam-si (KR); Deuk-Hoi Kim, Seoul (KR)

(73) Assignee: Chemtronics Co., Ltd, Chungcheongnam-do (KR)

( * ) Notice: Subject to any disclaimer, the term of this patent is extended or adjusted under 35 U.S.C. 154(b) by 366 days.

(21) Appl. No.: 12/996,737

(22) PCT Filed: May 28, 2009

(86) PCT No.: PCT/KR2009/002832
§ 371 (c)(1),
(2), (4) Date: Dec. 7, 2010

(87) PCT Pub. No.: WO2009/157654
PCT Pub. Date: Dec. 30, 2009

(65) Prior Publication Data
US 2011/0074673 A1   Mar. 31, 2011

(30) Foreign Application Priority Data
Jun. 27, 2008 (KR) .................. 10-2008-0062019

(51) Int. Cl.
*G09G 5/00* (2006.01)
(52) U.S. Cl.
USPC ......................................... 345/173; 345/174

(58) Field of Classification Search
USPC ............ 345/173, 174, 156; 178/18.01, 18.03
See application file for complete search history.

(56) References Cited

U.S. PATENT DOCUMENTS

| 7,199,789 | B2 * | 4/2007 | Endo et al. ............... 345/173 |
| 2004/0196269 | A1 * | 10/2004 | Dotson ..................... 345/173 |
| 2005/0140657 | A1 | 6/2005 | Park et al. |
| 2007/0229473 | A1 | 10/2007 | Kim et al. |
| 2010/0004030 | A1 * | 1/2010 | Nam ......................... 345/173 |

FOREIGN PATENT DOCUMENTS

| KR | 10-2005-0058582 A | 6/2005 |
| KR | 10-0630161 A | 10/2006 |
| KR | 10-2007-0097960 A | 10/2007 |
| KR | 10-2008-0029502 A | 4/2008 |
| WO | WO 2008/038871 A1 | 4/2008 |

* cited by examiner

*Primary Examiner* — Regina Liang
(74) *Attorney, Agent, or Firm* — Birch, Stewart, Kolasch & Birch, LLP (57) ABSTRACT

Provided is a moved touch sensing method. The moved touch sensing method according to an exemplary embodiment of the present invention includes: acquiring channel information corresponding a touch inputted into a contact region; converting each of first channel information and second channel information acquired as the touch moves into order information according to a predetermined order; and outputting a movement distance clock signal representing a movement distance of the touch on the basis of the converted order information. According to exemplary embodiments of the present invention, it is possible to reduce a burden of a control processor by outputting information regarding a movement distance and a movement direction of a moved touch by using two clock signals.

22 Claims, 4 Drawing Sheets

FIG. 6

METHOD, APPARATUS FOR SENSING MOVED TOUCH AND COMPUTER READABLE RECORD-MEDIUM ON WHICH PROGRAM FOR EXECUTING METHOD THEREOF

TECHNICAL FIELD

The present invention relates to a method for sensing a moved touch, and more particularly, to a method and an apparatus for sensing a moved touch that outputs a clock signal by sensing the moved touch while maintaining a contact state.

BACKGROUND ART

In recent years, a touch inputting device using an apparatus for sensing a touch, such as a touch sensor has been created and developed as an input device for controlling operations of electrical/electronic apparatuses.

In principle, the touch sensing apparatus recognizes a touch itself and the touch input device is used as the input means that senses the touch and outputs the sensed touch as a signal, but they are actually used without distinction.

Meanwhile, various methods using the touch sensing are used, but a method of sensing variation in an electrostatic capacity of a capacitance and transferring it to a microprocessor or a microcomputer as a signal when an electrode is installed at a contact part where the touch is actually made and a finger, and the like touch the contact part is widely used.

In the known touch sensing method, since input is easy and a mechanical operation is not included, there is no concern of mechanical abrasion as compared with a known input method by pressing a mechanical button, as a result, its use range is expanded.

In recent years, in addition to a button-type touch and a discrete touch, a wheel touch input type touch in which a user performs an input through movement of the touch while maintaining a contact state of the touch has appeared, for example.

In the wheel touch type touch, as the touch contractually moves, its input signal is generated. The generated input signal controls an operation of an external apparatus on which a touch sensing apparatus is mounted according to a movement distance and a movement direction of the touch.

However, in a known wheel touch recognizing type, the touch sensing apparatus continuously (alternatively, at a short time cycle) transfers information on a contact position of the touch to a control processor of the external apparatus.

By the way, according to such a known type, since the control processor of the external apparatus calculates a movement distance and a movement direction for each of all of the contact positions, the control processor becomes overloaded due to recognizing a wheel touch.

The problem is not consistent with miniaturization of electronic apparatuses and in addition, it becomes a more serious problem in terms of a tendency in which one electronic apparatus performs various functions (digital broadcasting, playing of stored moving pictures, voice and video calls, and the like).

DISCLOSURE

Technical Problem

Accordingly, the present invention is contrived to solve the problem and it is an object of the present invention to provide a method and an apparatus for sensing a moved touch that sense a touch which contractually moves in the moved touch sensing apparatus.

It is another object of the present invention to provide a method and an apparatus for sensing a moved touch that outputs information on a movement distance and a movement direction of the moved touch as only two clock signals.

Technical Solution

An exemplary embodiment of the present invention provides a moved touch sensing method.

The moved touch sensing method according to the exemplary embodiment of the present invention includes: (a) acquiring channel information corresponding a touch inputted into a contact region; (b) converting each of first channel information and second channel information acquired as the touch moves into order information according to a predetermined order; and (c) outputting a movement distance clock signal representing a movement distance of the touch on the basis of the converted order information.

The method may further include outputting a movement direction clock signal representing a movement direction of the touch on the basis of the order information after step (c).

The movement direction clock signal may be any one of a high clock signal and a low clock signal.

The movement distance clock signal may be transmitted to a control processor connected with the movement touch sensing apparatus and a movement speed of the touch may be calculated by using frequency information of the movement distance clock signal in the control processor.

At step (a), as the touch moves, when channel information corresponding to two or more contact panels in the contact region are simultaneously acquired, channel information corresponding to one of a contact panel having the largest intensity of touch sensitivity and a contact panel having the earliest touch sensing time may be selected.

The method may further include judging whether a contact panel corresponding to the first channel information and a contact panel corresponding to the second channel information are physically adjacent to each other between step (a) and step (b) and only when the contact panels are physically adjacent to each other according to judging whether the contact panels are physically adjacent to each other, step (c) may be performed.

At step (b), each of the first channel information and the second channel information may be converted into the order information by using order table information in which orders are sequentially granted to a plurality of contact panels constituting the contact region.

The method may further include setting a contact panel activated to sense movement of a touch among the plurality of contact panels constituting the contact region, before step (a), wherein only when the first channel information and the second channel information correspond to the activated contact panel, step (b) and step (c) may be performed.

Step (c) may include: calculating a movement distance of the touch on the basis of the order information; and outputting the movement distance clocks signal only when the movement distance is less than a predetermined reference value.

Step (b) may include: converting a plurality of channel information into predetermined order information; storing the order information from the order information corresponding to the first channel information in a first ring buffer in sequence; and storing the order information from the order information corresponding to the second channel information in a second ring buffer in sequence, wherein at step (c), the movement distance clock signal is outputted on the basis of a difference between the order information stored in the first ring buffer and the order information stored in the second ring buffer.

Step (c) may include: sequentially moving the order information corresponding to the first channel information stored in the first ring buffer to be positioned in a storage block having the same ranking as the storage block storing the order information corresponding to the first channel information stored in the second ring buffer; calculating the number of storage blocks to which the order information corresponding to the first channel information moves during the above-mentioned movement; generating the movement distance clock signal by using the calculated number of storage blocks; and outputting the generated movement distance clock signal.

Step (c) includes: judging whether the movement distance of the touch is larger than a reference value; and only when the movement distance is less than the reference value according to the judgment result, outputting the movement distance clock signal on the basis of the difference between the order information stored in the first ring buffer and the order information stored in the second ring buffer.

Another exemplary embodiment of the present invention provides a moved touch sensing apparatus.

The moved touch sensing apparatus according to another exemplary embodiment of the present invention includes: an acquiring unit acquiring channel information corresponding a touch inputted into a contact region; a channel information manager converting each of first channel information and second channel information acquired as the touch moves into order information according to a predetermined order; and a clock signal generator outputting a movement distance clock signal representing a movement distance of the touch on the basis of the converted order information.

The clock signal generator may further output a movement direction clock signal representing a movement direction of the touch on the basis of the order information.

The movement direction clock signal may be any one of a high clock signal and a low clock signal.

The movement distance clock signal may be transmitted to a control processor connected with the movement touch sensing apparatus and a movement speed of the touch may be calculated by using frequency information of the movement distance clock signal in the control processor.

As the touch moves, when channel information corresponding to two or more contact panels in the contact region are simultaneously acquired, the channel information manager may select channel information corresponding to one of a contact panel having the largest intensity of touch sensitivity and a contact panel having the earliest touch sensing time.

The acquiring unit may judge whether a contact panel corresponding to the first channel information and a contact panel corresponding to the second channel information are physically adjacent to each other and only when the contact panels are physically adjacent to each other according to judging whether the contact panels are physically adjacent to each other, the channel information manager may convert the channel information into the order information.

The channel information manager may convert each of the first channel information and the second channel information into the order information by using order table information in which orders are sequentially granted to a plurality of contact panels constituting the contact region.

The apparatus may further include a setting unit setting a contact panel activated to sense movement of a touch among the plurality of contact panels constituting the contact region, wherein only when the first channel information and the second channel information correspond to the activated contact panel, the channel information manager may convert the channel information into the order information.

The clock signal generator may calculate a movement distance of the touch on the basis of the order information and output the movement distance clocks signal only when the movement distance is less than a predetermined reference value.

The apparatus may further include: a first ring buffer storing the order information into which a plurality of channel information is converted from the order information corresponding to the first channel information in sequence; and a second ring buffer storing the order information from the order information corresponding to the second channel information in sequence, wherein the channel information manager outputs the movement distance clock signal on the basis of a difference between the order information stored in the first ring buffer and the order information stored in the second ring buffer.

The clock signal generator may sequentially move the order information corresponding to the first channel information stored in the first ring buffer to be positioned in a storage block having the same ranking as the storage block storing the order information corresponding to the first channel information stored in the second ring buffer, and during the movement, the number of storage blocks to which the order information corresponding to the first channel information moves may be calculated, the movement distance clock signal may be generated by using the calculated number of storage blocks, and the generated movement distance clock signal may be outputted.

The clock signal generator may judge whether the movement distance of the touch is larger than a reference value, and only when the movement distance is less than the reference value according to the judgment result, output the movement distance clock signal on the basis of the difference between the order information stored in the first ring buffer and the order information stored in the second ring buffer.

The contact region may have any one of a ring shape, a straight-line shape, a curved shape, an oval shape, and a circular shape.

The apparatus may further include a plurality of capacitances storing electric charges that flows for each of channels corresponding to the plurality of contact panels included in the contact region, wherein a clock value of a digital signal generated by variation of an electrostatic capacity stored in the capacitance may be counted and the electrostatic capacity of the capacitance may be calculated by using the counted clock value.

Yet another exemplary embodiment of the present invention provides a recording medium storing programs which are readable by a digital processing device.

Programs for commands which are executable by the digital processing device may be implemented for each type in order to perform the above-mentioned moved touch sensing method.

Advantageous Effects

According to exemplary embodiments of the present invention, a moved touch sensing apparatus can sense a touch which contractually moves by using two clock signals.

Further, according to the exemplary embodiments of the present invention, it is possible to reduce a load of a processor that controls an external apparatus by outputting information on a movement distance and a movement direction of a moved touch as only clock signals.

MODE FOR INVENTION

Hereinafter, exemplary embodiments of a method and an apparatus for sensing a moved touch will be described in detail with reference to the accompanying drawings. However, the present invention is not limited to the specific embodiments and should be construed as including all the changes, equivalents, and substitutions included in the spirit and scope of the present invention. Further, in describing the present invention, well-known functions or constructions will not be described in detail since they may unnecessarily obscure the understanding of the present invention. Further, in describing with reference to the accompanying drawings, like reference numerals refer to like or corresponding elements and a duplicated description thereof will be omitted.

Terms including ordinal numbers such as 'second', 'first', etc. can be used to describe various components, but the components are not limited to the terms. Terms described in the specification is used to discriminate one component from other components. For example, the second component may be called the first component without departing from the scope of the present invention. Likewise, the first component may be called the second component. The term 'and/or' includes a combination of a plurality of items or any one of a plurality of terms.

A moved touch sensing apparatus according to the present invention senses a user's touch (hereinafter, referred to as a "moved touch") that moves while maintaining a contact state. Herein, the moved touch means moving the touch without taking off an object or a human body (e.g., fingers) performing the touch such as a user's wheel touch or slide touch.

In detail, a user may perform the moved touch by using his/her fingers. In this case, the moved touch sensing apparatus acquires a movement distance of the moved touch. In addition, the moved touch sensing apparatus generates a clock signal for the movement distance. The generated clock signal is transferred to a control processor (e.g., a CPU) of an external apparatus mounted with the moved touch sensing apparatus. In this case, the control processor of the external apparatus may calculate the movement distance of the moved touch through the transferred clock signals, as a result, may control an operation of the external apparatus.

Herein, the external apparatuses as electronic apparatuses mounted with the moved touch sensing apparatus may be portable apparatuses (including a PMP, an MP3, and the like), home appliances (a television, an air-conditioner, and the like) or a personal digital assistant (PDA), a cellular phone, a personal communication service (PCS) phone, and the like.

Further, in the present invention, the moved touch sensing apparatus may include a moved touch sensing apparatus based on an electrostatic capacity using static electricity of a contacted human body, a moved touch sensing apparatus including a touch panel sensing a position or a pressure, and the like.

Herein, the touch input apparatus based on the electrostatic capacity recognizes a touch by using a difference in intensity between a reference electrostatic capacity generated in a reference electrode and a variable electrostatic capacity generated in a sensor electrode by the touch and the moved touch sensing apparatus including the touch panel generates an input signal by sensing the position or pressure. In the specification, for clear comprehension, the moved touch sensing apparatus based on the electrostatic capacity is described as a representative example, but it will be apparent to those skilled in the art that the moved touch sensing apparatus is not limited thereto.

In the specification, as a method for generating a movement distance clock signal in a moved touch sensing apparatus, a method of using order table information (first exemplary embodiment) and a method using a ring buffer (second exemplary embodiment) will be described as representative examples. However, the present invention is not limited thereto and the method includes all methods for the moved touch sensing apparatus to output information on a movement distance of the moved touch as the movement distance clock signal.

Hereinafter, referring to FIG. 1, components of a moved touch sensing apparatus will be described in detail for each functional element.

Figure 1:
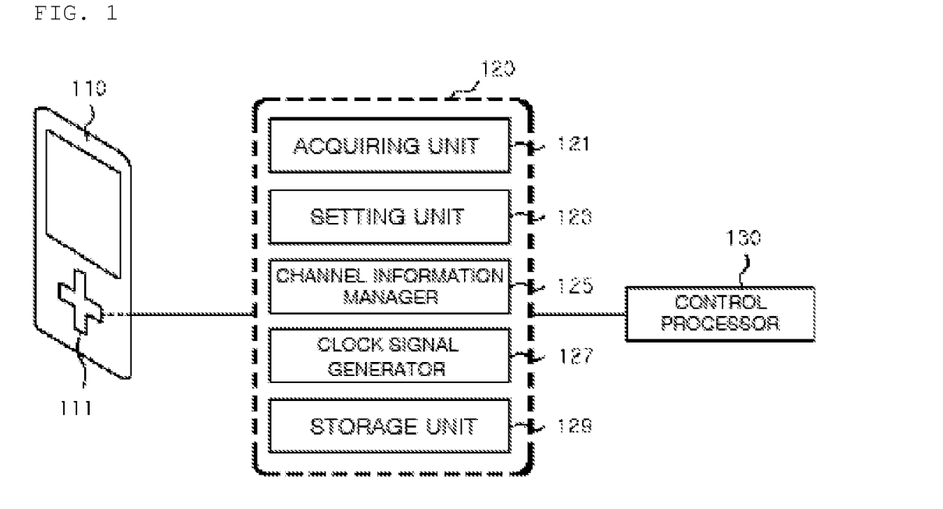
FIG. 1 is a configuration diagram of a moved touch sensing apparatus according to an exemplary embodiment of the present invention.

FIG. 1 is a configuration diagram of a moved touch sensing apparatus 120 according to an exemplary embodiment of the present invention.

Referring to FIG. 1, the moved touch sensing apparatus 120 is electrically connected with an outer case 110 of an external apparatus. Further, the moved touch sensing apparatus 120 is connected with a control processor 130 that controls an operation of the external apparatus.

A user touches a region for a touch, i.e., a contact region 111 in the outer case 110 to perform an input into the external apparatus. In the case where the inputted touch is a contractually moved touch (hereinafter, the "moved touch"), the moved touch sensing apparatus 120 outputs a movement distance clock signal representing a movement distance of the corresponding moved touch to the control processor 130. Further, the moved touch sensing apparatus 120 may output a movement direction clock signal of the corresponding moved touch.

Herein, the contact region 111 may include a plurality of contact panels having predetermined orders. Further, the contact region 111 may have a ring shape, a circular shape, a straight-line shape and a curved shape.

The control processor 130 controls the operation of the external apparatus and performs an operation required by the user by using the movement distance clock signal and the movement direction clock signal.

Herein, the moved touch sensing apparatus 120 may include an acquiring unit 121, a setting unit 123, a channel information manager 125, a clock signal generator 127, and a storage unit 129.

The acquiring unit 121 acquires channel information corresponding to a touch inputted into the contact region 111. Meanwhile, although not shown in FIG. 1, the acquiring unit 121 may include a capacitance. The capacitance stores microcurrent that flows between an electrode and a person when a contact occurs. The acquiring unit 121 senses variation in an electrostatic capacity by a contact dimension, a contact time, a contact pressure, and the like by using the capacitance.

Further, the acquiring unit 121 converts a predetermined waveform generated depending on the variation of the electrostatic capacity into a digital signal. Hereinafter, the acquiring unit 121 counts a clock value of the converted digital signal to express the variation in the electrostatic capacity by a difference in the counted clock value. That is, when the variation in the electrostatic capacity is equal to or more than a predetermined value, the touch is performed in the contact region 111. The above-mentioned scheme is a general technology of the moved touch sensing apparatus 120 using the variation in the electrostatic capacity and a detailed description thereof will be omitted.

The clock signal generator 127 to be described below and a counter may be implemented by being included in the acquiring unit 121. Of course, the acquiring unit 121 may be implemented as an additional component and in the present invention, the clock signal generator 127 is separately implemented for better comprehension and ease of description and will now be described.

Various types of oscillation circuits may be used in the clock signal generator 127, but according to the exemplary embodiment of the present invention, a resistor-capacitor (RC) oscillation circuit may be used. In addition, the clock signal generator converts a saw wave generated by the RC oscillation circuit into a clock signal and provides it to a counter. A Schmitt trigger circuit may be used as another clock signal generator. Other functions of the clock signal generator 127 will be described below in the present invention.

As described above, the acquiring unit 121 acquires channel information corresponding to the touch inputted into the contact region 111. For example, it is assumed that the user drags the contact region 111, that is, the moved touch is performed. The acquiring unit 121 acquires first channel information corresponding to a first contact panel were the corresponding moved touch is generated. In addition, the acquiring unit 121 acquires second channel information corresponding to a contact panel changed as the touch moves.

Further, the acquiring unit 121 may judge whether the contact panel corresponding to the first channel information and the contact panel corresponding to the second channel information are physically adjacent to each other.

According to the judgment result of the acquiring unit 121, when the control panels are physically adjacent to each other, the touch is judged as the moved touch which maintains a contact state. Further, the moved touch sensing apparatus 120 may output the movement direction clock signal when the touch is judged as the moved touch.

In detail, the acquiring unit 121 may judge whether a user's touch is the moved touch or a discrete touch. The acquiring unit 121 may judge whether the contact panel corresponding to each of the first channel information and the second channel information is continuous (that is, physically adjacent). The acquiring unit 121 judges that the touch is the moved touch when the contact panels are adjacent to each other. However, the acquiring unit 121 may judge that the touch is the discrete touch when the touch is not an adjacent touch.

Herein, whether the touch is the adjacent touch may be judged by up to one contact panel or two contact panels that are adjacent. This may be set in producing the moved touch sensing apparatus 120 and may be set or modified after producing the moved touch sensing apparatus 120.

The setting unit 123 sets a contact panel activated in order to sense the moved touch among a plurality of contact panels of the contact region 111.

In the first exemplary embodiment of the present invention, the setting unit 123 sets the contact panel to be activated for the moved touch by a user (alternatively, a product manufacturer). For example, refer to a contact region 111 having a cross shape of FIG. 1. When a central region (i.e., a region where a horizontal region and a vertical region intersect) of the cross is used as only the discrete touch and not used as the moved touch, the user (alternatively, the product manufacturer) may activate only a region other than the corresponding central region as the contact region 111 for the moved touch. In this case, the setting unit 123 sets only the contact panel corresponding to the activated contact region 111 as 1 and sets the rest of the region as 0 in order to set them as channel information which is not referred in the moved touch. A description thereof will be made in detail with reference to FIG. 3.

The channel information manager 125 converts each of the first channel information and the second channel information acquired as the touch moves into order information according to a predetermined order.

In detail, the channel information manager 125 converts each of the channel information of contact panels acquired by the acquiring unit 121, i.e., touched by the user into the order information. Herein, the order information has a predetermined order, e.g., the first channel information and the second channel information may be converted into order information of "1" and "2", respectively.

According to the first exemplary embodiment of the present invention, the channel information manager 125 converts the channel information into the order information by using order table information. Meanwhile, according to a second exemplary embodiment of the present invention, the channel information manager 125 converts the channel information into the order information by using a ring buffer.

The detailed method (first exemplary embodiment) using the order table information and the detailed method (second exemplary embodiment) using the ring buffer will be described in detail in FIGS. 3 and 4 as an example, respectively.

Further, when channel information corresponding to two or more contact panels in the contact region 111 are simultaneously acquired as the touch moves, the channel information manager 125 may select channel information corresponding to one contact panel. As the user's touch continuously moves, two touches may simultaneously occur. In this case, the channel information manager 125 may select a touch panel touched depending on the intensity of touch sensitivity or a touch occurrence time.

In detail, the channel information manager 125 may select the contact panel on the basis of the intensity of the touch sensitivity or a touch sensing time. That is, when the contact panels are simultaneously touched by the user at a predetermined time, the channel information manager 125 may select channel information corresponding to one of a contact panel having the largest intensity of the touch sensitivity and a contact panel having the earliest touch sensing time. For example, in the electrostatic capacity type touch sensing apparatus, the channel information manager 125 may judge that the touch occurs in a contact panel having the largest variation of the electrostatic capacity when the simultaneous touch occur. Alternatively, the channel information manager 125 may judge that the touch occurs in a contact panel where the electrostatic capacity first varies when the simultaneous touch occurs.

The clock signal generator 127 generates the movement distance clock signal by using the order information converted by the channel information manager 125. Further, the clock signal generator 127 may generate the movement direction clock signal by using the order information.

Herein, the clock signal may be expressed as a voltage signal having two levels. For example, the clock signal may be a voltage signal having two voltage levels of 0V and 5V (see FIG. 5).

For example, the movement distance clock signal may have 5V for a predetermined time (one clock) and 0V for the rest time when the user performs one-space touch movement. In addition, the movement direction clock signal may be a high clock signal (e.g., a clock signal outputting 5V) when the user performs a clockwise wheel touch and a low clock signal (e.g., a clock signal outputting 0V) when the user performs a counterclockwise wheel touch.

The generated clock signal is transmitted to the control processor 130 of the external apparatus mounted with the moved touch sensing apparatus 120. In this case, the control processor 130 may calculate movement distances and movement directions (i.e., the movement distance and the movement direction of the moved touch) of a first contact location and a second contact location by using two received clock signals (the movement distance clock signal and the movement direction clock signal). Accordingly, the control processor 130 may recognize an inputted moved touch and control an operation of the external apparatus according to the recognized moved touch.

Therefore, according to the present invention, it is advantages to recognize the moved touch by only two clock signals. In the related art, even a touch location is transmitted to the control processor 130 of the external apparatus, which has an overburden, but the present invention is more efficient in that the movement distance and the movement direction can be recognized by only two clock signals.

Further, the control processor 130 may calculate a movement speed (alternatively, acceleration) by using the received movement distance clock signal. In detail, the control processor 130 may calculate the movement speed (alternatively, acceleration) by using frequency information of the movement distance clock signal.

Since the frequency of the movement distance clock signal represents the number of channels moved for a predetermined time, it is possible to calculate the movement speed of the touch by using the frequency information. Of course, when the movement speed of the moved touch is calculated for each period, the acceleration of the moved touch may be calculated.

Accordingly, it is possible to calculate the movement speed and the acceleration of the moved touch by using the frequency information of the movement distance clock signal.

Further, the clock signal generator 127 may judge whether the movement distance of the moved touch is larger than a predetermined reference value. In detail, the clock signal generator 127 may judge whether the calculated movement distance is larger than a predetermined reference value.

The clock signal generator 127 recognizes the moved touch as an excessive moved touch and judges the moved touch invalid when the calculated movement distance is larger than the predetermined value according to the judgment result.

As a result, the moved touch sensing apparatus 120 according to the present invention does not require complicated calculation caused by the excessive moved touch and thereafter, may sense a new moved touch (i.e., a valid moved touch) rapidly.

The storage unit 129 may store a predetermined program controlling an overall operation of the moved touch sensing apparatus 120 and input and output data and various processed data.

Further, the storage unit 129 according to the first exemplary embodiment of the present invention may store the order table information and the information regarding the activated contact panel. Herein, in the order table information, orders are granted to a plurality of contact panels constituting the contact region 111.

In addition, the storage unit 129 according to the second exemplary embodiment of the present invention may include a first ring buffer and a second ring buffer. Herein, the ring buffers store the channel information corresponding to the contact panel. In detail the ring buffer includes a plurality of storage blocks. In the storage method of the ring buffer (hereinafter, referred to as a "ring buffer storage method"), input data are sequentially stored in the storage blocks. In addition, the ring buffer stores data as large as a memory capacity thereof and thereafter, stores latest data by overwriting the latest data to a storage block storing the oldest data. That is, the ring buffer stores data in an endless loop form.

Further, in the ring buffer, the storage block is not implemented physically in a circular form and data to be stored may be stored in the ring buffer storage method. That is, the ring buffer includes all buffers that implement the ring buffer storage method by using a pointer indicating the storage block.

Hereinafter, in the specification, a case in which the ring buffer is constituted by a plurality of storage blocks and one channel information may be stored in one storage block will be described as a representative example. However, it is apparent to those skilled in the art that the present invention is not limited to the described example.

In the specification, the acquiring unit 121, the setting unit 123, the channel information manager 125, the clock signal generator 127, and the storage unit 129 are separately expressed according to their functions. However, it is for better comprehension and ease of description and they may be implemented in one circuit. In particular, the acquiring unit 121, the setting unit 123, the channel information manager 125, and the clock signal generator 127 are expressed as separate modules, but may be implemented in a microcircuit as one logic unit.

Up to now, referring to FIG. 1, the moved touch sensing apparatus 120 according to the exemplary embodiment of the present invention has been described. Hereinafter, referring to FIG. 2, a moved touch sensing method will be described in detail.

Figure 2:
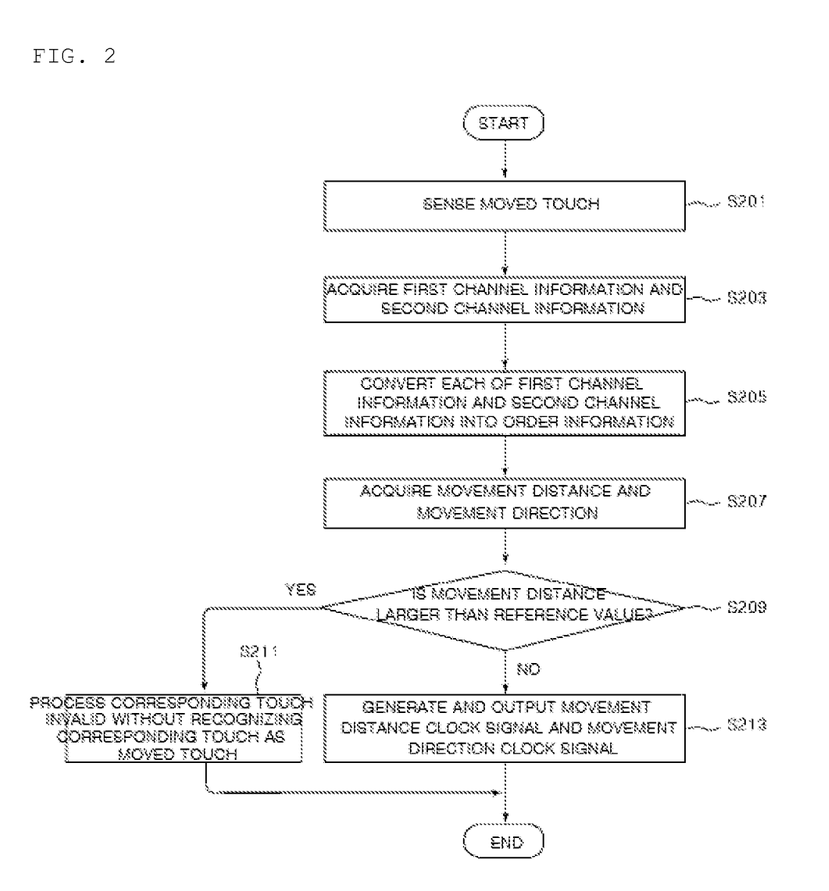
FIG. 2 is a flowchart of a moved touch sensing method according to an exemplary embodiment of the present invention.

FIG. 2 is a flowchart of a moved touch sensing method according to an exemplary embodiment of the present invention.

Referring to FIG. 2, the moved touch sensing apparatus 120 senses a touch (hereinafter, referred to as a "moved touch") that moves while maintaining a contact state. In detail, the moved touch sensing apparatus 120 acquires channel information (first channel information and second channel information) corresponding to a touch inputted into a contact region 111 of the moved touch to output a movement distance clock signal and a movement direction clock signal when the moved touch occurs.

At step S201, the moved touch sensing apparatus 120 senses the moved touch inputted into the contact region 111.

Subsequently, at step S203, the moved touch sensing apparatus 120 acquires channel information corresponding to the sensed moved touch. In detail, the moved touch sensing apparatus 120 acquires first channel information and second channel information according to the moved touch.

Subsequently, at step S205, the moved touch sensing apparatus 120 converts each of the first channel information and the second channel information acquired at step S203 into order information.

The moved touch sensing apparatus 120 in the first exemplary embodiment of the present invention uses the order table information and the moved touch sensing apparatus 120 in the second exemplary embodiment of the present invention uses the ring buffer.

The first exemplary embodiment of the present invention and the second exemplary embodiment of the present invention will be described in detail as an example in FIG. 3 and FIG. 4, respectively.

Subsequently, at step S207, the moved touch sensing apparatus 120 acquires a movement distance and a movement direction of the corresponding moved touch by using the order information converted at step S205.

For example, it is assumed that the first channel information is converted into order information of "1" and the second channel information is converted into order information of "3".

In the case in which the movement distance is 2 and the movement direction is the clockwise direction (the contact region 111 has a circular form and the order is set in the clockwise direction), when the user performs the touch while maintaining-the contact state of four contact panels, the moved touch sensing apparatus 120 may calculate four movement distances by using the order information and detect whether the movement direction of the moved touch is the clockwise direction or the counterclockwise direction.

Subsequently, at step S209, the moved touch sensing apparatus 120 judges whether the movement distance is larger than a reference value. In the case where the moved touch moves at a too long distance, the moved touch sensing apparatus processes the corresponding moved touch invalid.

The moved touch sensing apparatus 120 performs step S211 when the movement distance is larger than the reference value according to the judgment result at S209.

At step S211, the moved touch sensing apparatus 120 processes the corresponding moved touch invalid. As a result, the moved touch sensing apparatus 120 may reduce a calculation load caused by the excessive moved touch and thereafter, may sense a new moved touch (i.e., a valid moved touch) rapidly.

Meanwhile, the moved touch sensing apparatus 120 performs step S213 when the movement distance is larger than the reference value according to the judgment result at S209.

At step S213, the moved touch sensing apparatus 120 generates a clock signal. In addition, the moved touch sensing apparatus 120 outputs the generated clock signal.

In detail, the moved touch sensing apparatus 120 generates a movement distance clock signal representing the calculated movement distance and a movement direction clock signal representing the detected movement direction. In addition, the moved touch sensing apparatus 120 outputs the generated clock signals to a control processor 130 of an external apparatus mounted with the corresponding moved touch sensing apparatus 120.

Herein, the clock signal may be implemented in the form of a voltage signal having two levels and the control processor 130 of the external apparatus may calculate a movement speed (including an acceleration) of the moved touch by using the transferred movement distance clock signal as described above.

Up to now, referring to FIG. 2, the moved touch sensing method according to the exemplary embodiment of the present invention has been described. Hereinafter, referring to FIGS. 3 and 4, a method of converting the channel information into the order information in the moved touch sensing method will be described in detail.

Figure 3:
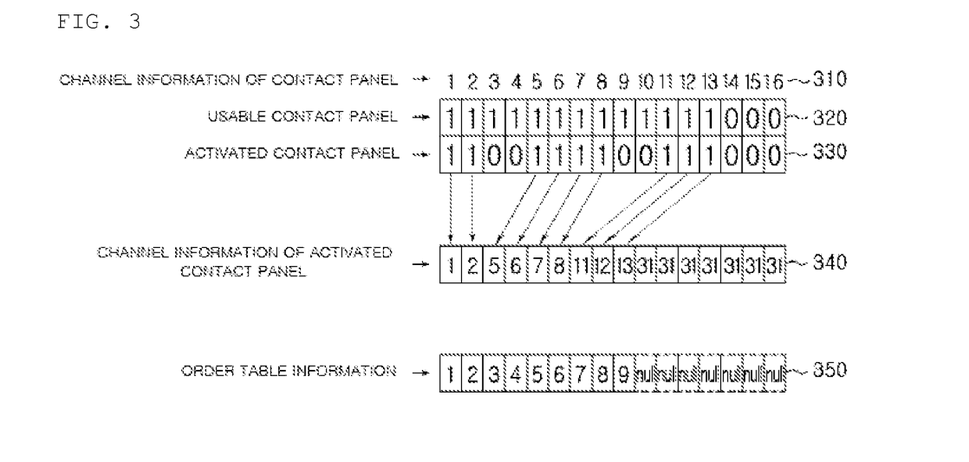
FIG. 3 is an exemplary diagram for describing a moved touch sensing method according to a first exemplary embodiment of the present invention.

FIG. 3 is an exemplary diagram for describing the moved touch sensing method according to the first exemplary embodiment of the present invention.

According to the first exemplary embodiment of the present invention, the moved touch sensing apparatus 120 converts the acquired channel information into the order information by using order table information 350. Referring to FIG. 3, a method of converting channel information corresponding to moved touches inputted into 13 contact panels into the order information in the moved touch sensing apparatus 120 will be described as an example.

Referring to reference numeral 310, 16 channel information correspond to contact panels, respectively. In the first exemplary embodiment of the present invention, channel information 1 to 16 are set in the contact panels.

Referring to reference numeral 320, only contact panels 1 to 13 are usable among 16 contact panels. That is, the usable contact panels are set as "1" and unusable contact panels (alternatively, contact panels which do not exist) are set as "0".

A user (alternatively, a product manufacturer) may activate some or all of the contact panels for the moved touch. That is, the user may previously set a contact panel into which the moved touch will be inputted. Referring to reference numeral 330, channel information 1, 2, 5, 6, 7, 8, 11, 12, and 13 are channel information of the activated contact panels.

Referring to reference numeral 340, only the activated channel information is previously set. Therefore, when the user touches inactivated contact panels (i.e., 3, 4, 9, and 10), the moved touch sensing apparatus 120 does not recognize the corresponding touches as the moved touch.

The moved touch sensing apparatus 120 generates the order table information 350 having a predetermined order in the activated channel information. Reference numeral 350 represents the order table information 350 in which orders corresponding to channel information 1, 2, 5, 6, 7, 8, 11, 12, and 13 are set as 1 to 9.

For example, it is assumed that the user movably touches a contact panel having channel information 1 to a contact panel having channel information 5. The moved touch sensing apparatus 120 acquires no. 1 (first channel information) and no. 5 (second channel information) as channel information caused by the moved touch. In addition, the moved touch sensing apparatus 120 converts no. 1 into order information of "1" and no. 5 into order information of "3" by using the order table information 350 of reference numeral 350.

Accordingly, according to the first exemplary embodiment of the present invention, the moved touch sensing apparatus 120 may determine that the movement distance is 2 by using the order information. Further, the moved touch sensing apparatus 120 may detect whether the movement direction of the moved touch is the clockwise direction or the counterclockwise direction by using a predetermined direction.

Figure 4:
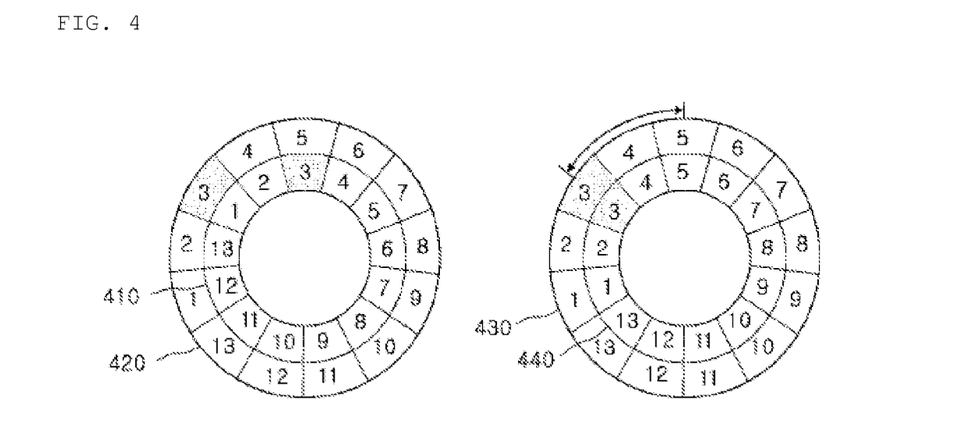
FIG. 4 is an exemplary diagram for describing a moved touch sensing method according to a second exemplary embodiment of the present invention.

FIG. 4 is an exemplary diagram for describing a moved touch sensing method according to a second exemplary embodiment of the present invention.

According to the second exemplary embodiment of the present invention, the moved touch sensing apparatus 120 converts the acquired channel information into order information by using a ring buffer. Referring to FIG. 4, a method of converting channel information corresponding to moved touches inputted into 13 contact panels into the order information in the moved touch sensing apparatus 120 will be described as an example.

According to the second exemplary embodiment of the present invention, the moved touch sensing apparatus 120 includes first ring buffers 410 and 440 and second ring buffers 420 and 430.

The touch sensing apparatus 120 converts channel information into predetermined order information. Herein, the predetermined order information may be based on physical locations of contact panels constituting a contact region 111.

Referring to reference numeral 410, when the moved touch sensing apparatus 120 acquires the first channel information, it stores the order information in the first ring buffer 410 sequentially from order information corresponding to the first channel information.

In addition, referring to reference numeral 420, when the moved touch sensing apparatus 120 acquires the second channel information acquired as the touch moves, it stores the order information in the second ring buffer 420 sequentially from order information corresponding to the second channel information.

Accordingly, referring to reference numerals 410 and 420, each of the first ring buffer 410 and the second ring buffer 420 stores the order information in sequence. However, rankings of storage blocks storing the order information are different from each other.

In this case, referring to reference numerals 440 and 430, the moved touch sensing apparatus 120 sequentially moves the order information corresponding to the first channel information stored in the first ring buffer 440 to be positioned in a storage block having the same ranking as the storage block storing the order information corresponding to the first channel information stored in the second ring buffer 430.

In addition, the moved touch sensing apparatus 120 calculates the number of storage blocks to which the first channel information moves during the above-mentioned movement. The moved touch sensing apparatus 120 generates a movement distance clock signal representing a movement distance of the corresponding movement touch by using the calculated number of storage blocks.

Further, the moved touch sensing apparatus 120 detects a direction in which the first channel information moves. The moved touch sensing apparatus 120 generates a movement direction clock signal representing a movement direction of the corresponding moved touch by using the detected movement direction (a clockwise direction or a counterclockwise direction).

The moved touch sensing apparatus 120 outputs the generated clock signals to the control processor 130.

For example, when the user moves to a contact panel corresponding to order information of "5" while maintaining a contact by touching a contact panel corresponding to order information of "3", the moved touch sensing apparatus 120 first stores 3 in the first ring buffer 410 in sequence and first stores 5 in the second ring buffer 420 in sequence. In addition, the moved touch sensing apparatus 120 moves 3 to two storage blocks to have the same ranking as a location (i.e., storage block) where 3 is stored.

In this case, the moved touch sensing apparatus 120 calculates a movement distance of 2 and detects that 2 moves in the counterclockwise direction.

Figure 5:
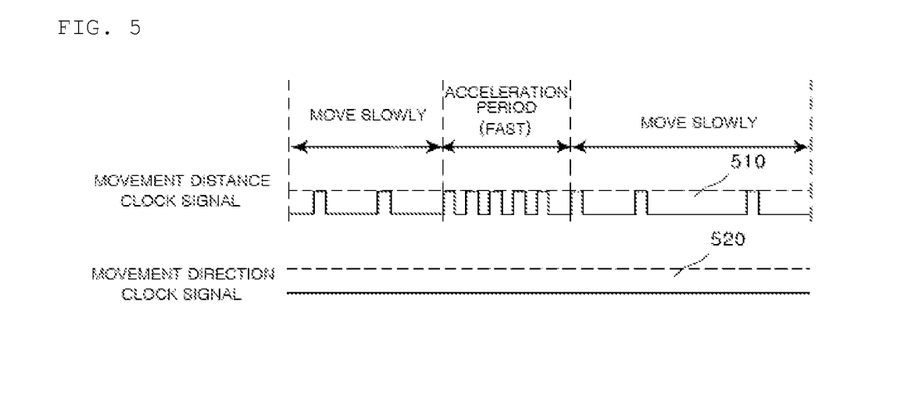
FIG. 5 is an exemplary diagram for describing a clock signal according to an exemplary embodiment of the present invention.

FIG. 5 is an exemplary diagram for describing a clock signal according to an exemplary embodiment of the present invention.

The clock signal includes a movement distance clock signal 510 and a movement direction clock signal 520. In the example of FIG. 4, the moved touch sensing apparatus 120 calculates that two storage blocks moves and judges that two storage blocks moves in the counterclockwise direction.

As a result, the moved touch sensing apparatus 120 (particularly, the clock signal generator 127) generates a movement distance clock signal 510 having two high periods as shown in FIG. 5.

Meanwhile, when the user performs the moved touch more rapidly, the moved touch sensing apparatus 120 generates the movement distance clock signal 510 at a shorter interval. Thereafter, when a movement speed of the moved touch is slow, the moved touch sensing apparatus 120 may generate the movement distance clock signal 510 at a long interval. That is, the movement distance clock signal 510 reflects the speed (alternatively, an acceleration) of the moved touch sensed by using the time interval of the clock. Accordingly, the control processor 130 of the external apparatus receiving the generated movement distance clock signal 510 may calculate the movement distance and the speed (alternatively, the acceleration) of the moved touch.

Further, the moved touch sensing apparatus 120 may generate a movement direction clock signal 520 having a low level. In detail, the moved touch sensing apparatus 120 may generate the movement direction clock signal 520 having the low level according to the detected movement direction (moves in the counterclockwise direction of the moved touch).

Unlike the above-mentioned example, when three storage blocks are provided in the clockwise direction, a movement distance clock signal 510 having three high periods and a clock signal having a high level may be generated.

Figure 6:
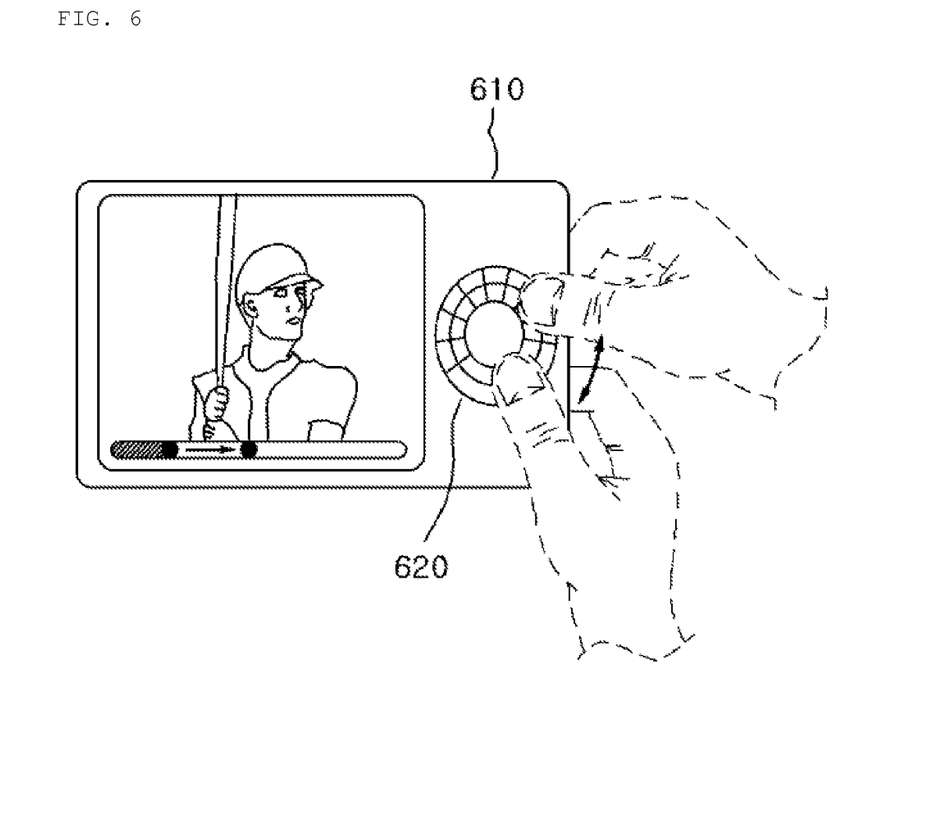
FIG. 6 is an exemplary diagram of the external apparatus mounted with the moved touch sensing apparatus according to the exemplary embodiment of the present invention.

FIG. 6 is an exemplary diagram of the external apparatus mounted with the moved touch sensing apparatus 120 according to the exemplary embodiment of the present invention.

Referring to FIG. 6, the moved touch sensing apparatus 120 is mounted with a portable multimedia player (PMP) 610. In this case, the user is playing a moving picture of a baseball game and a scroll bar for playing the moving picture is displayed below a screen.

Accordingly, the user may control (for example, fast forwarding or rewinding) of the moving picture played by movably touching a contact region 620 at the right side of the PMP 610.

The contact region 111 may be implemented in a circular shape, a straight-line shape, a curved shape, an oval shape, and a ring shape and in FIG. 6, the contact region 111 has the ring shape.

Therefore, the user may wheel-touch the ring-shape contact region 620 and control playing the moving picture according to the wheel touch.

According to the exemplary embodiment of the present invention, the user movably touches the contact region 620. In this case, the moved touch sensing apparatus 120 outputs the movement distance clock signal and the movement direction clock signal representing information regarding a distance and a direction of the moved touch. Two outputted clock signals are transferred to the control processor 130 of the external apparatus 610 to control an operation of the external apparatus 610 according to user's touch input.

Accordingly, according to the present invention, since the moved touch sensing apparatus 120 (including a touch sensor, a touch screen, a touch pad, and the like) provides the movement distance information and the movement direction information by using only two clock signals, the control processor 130 does not need to judge the touch location of the touch to improve information processing efficiency of the control processor 130.

The present invention can be implemented as a computer-readable code in a computer-readable recording medium. The computer-readable recording media includes all types of recording apparatuses in which data readable by a computer system is stored.

For example, the computer-readable recording media may include a ROM, a RAM, a CD-ROM, a magnetic tape, a floppy disk, an optical data storage device, and the like.

In the above description, although exemplary embodiments of the present invention have been described, it will be appreciated by those skilled in the art that various modifications and change can be made without departing from the spirits and scope of the appended claims of the present invention.

The invention claimed is:

1. A method for sensing a moved touch under a contact state in a moved touch sensing apparatus, the method comprising:
   (a) acquiring channel information corresponding a touch inputted into a contact region;
   (b) converting each of first channel information and second channel information acquired as the touch moves into order information according to a predetermined order; and
   (c) outputting a movement distance clock signal representing a movement distance of the touch on the basis of the converted order information,
   wherein step(b) includes:
   converting a plurality of channel information into predetermined order information;
   storing the order information from the order information corresponding to the first channel information in a first ring buffer in sequence; and
   storing the order information from the order information corresponding to the second channel information in a second ring buffer in sequence,
   wherein at step (c), the movement distance clock signal is outputted on the basis of a difference between the order information stored in the first ring buffer and the order information stored in the second ring buffer, and
   wherein step (c) includes:
   sequentially moving the order information corresponding to the first channel information stored in the first ring buffer to be positioned in a storage block having the same ranking as the storage block storing the order information corresponding to the first channel information stored in the second ring buffer;
   calculating the number of storage blocks to which the order information corresponding to the first channel information moves during the above-mentioned movement;
   generating the movement distance clock signal by using the calculated number of storage blocks; and
   outputting the generated movement distance clock signal.

2. The method of claim 1, further comprising outputting a movement direction clock signal representing a movement direction of the touch on the basis of the order information after step (c).

3. The method of claim 2, wherein the movement direction clock signal is any one of a high clock signal and a low clock signal.

4. The method of claim 1, wherein the movement distance clock signal is transmitted to a control processor connected with the movement touch sensing apparatus and a movement speed of the touch is calculated by using frequency information of the movement distance clock signal in the control processor.

5. The method of claim 1, wherein at step (a), as the touch moves, when channel information corresponding to two or more contact panels in the contact region are simultaneously acquired, channel information corresponding to one of a contact panel having the largest intensity of touch sensitivity and a contact panel having the earliest touch sensing time is selected.

6. The method of claim 1, wherein the method further includes judging whether a contact panel corresponding to the first channel information and a contact panel corresponding to the second channel information are physically adjacent to each other between step (a) and step (b), and
   only when the contact panels are physically adjacent to each other according to judging whether the contact panels are physically adjacent to each other, step (c) is performed.

7. The method of claim 1, wherein at step (b), each of the first channel information and the second channel information is converted into the order information by using order table information in which orders are sequentially granted to a plurality of contact panels constituting the contact region.

8. The method of claim 7, further comprising setting a contact panel activated to sense movement of a touch among the plurality of contact panels constituting the contact region, before step (a),
   wherein only when the first channel information and the second channel information correspond to the activated contact panel, step (b) and step (c) are performed.

9. The method of claim 7, wherein step (c) includes:
   calculating a movement distance of the touch on the basis of the order information; and
   outputting the movement distance clocks signal only when the movement distance is less than a predetermined reference value.

10. The method of claim 1, wherein step (c) includes:
    judging whether the movement distance of the touch is larger than a reference value; and only when the movement distance is less than the reference value according to the judgment result, outputting the movement distance clock signal on the basis of the difference between the order information stored in the first ring buffer and the order information stored in the second ring buffer.

11. A moved touch sensing apparatus sensing a touch moving under a contact state, the apparatus comprising:
    an acquiring unit acquiring channel information corresponding a touch inputted into a contact region;
    a channel information manager converting each of first channel information and second channel information acquired as the touch moves into order information according to a predetermined order;
    a clock signal generator outputting a movement distance clock signal representing a movement distance of the touch on the basis of the converted order information;
    a first ring buffer storing the order information into which a plurality of channel information is converted from the order information corresponding to the first channel information in sequence; and
    a second ring buffer storing the order information from the order information corresponding to the second channel information in sequence,
    wherein the channel information manager outputs the movement distance clock signal on the basis of a difference between the order information stored in the first ring buffer and the order information stored in the second ring buffer, wherein the clock signal generator sequentially moves the order information corresponding to the first channel information stored in the first ring buffer to be positioned in a storage block having the same ranking as the storage block storing the order information corresponding to the first channel information stored in the second ring buffer; and during the movement, the number of storage blocks to which the order information corresponding to the first channel information moves is calculated, the movement distance clock signal is generated by using the calculated number of storage blocks, and the generated movement distance clock signal is outputted.

12. The apparatus of claim 11, wherein the clock signal generator further outputs a movement direction clock signal representing a movement direction of the touch on the basis of the order information.

13. The apparatus of claim 11, wherein the movement direction clock signal is any one of a high clock signal and a low clock signal.

14. The apparatus of claim 11, wherein the movement distance clock signal is transmitted to a control processor connected with the movement touch sensing apparatus and a movement speed of the touch is calculated by using frequency information of the movement distance clock signal in the control processor.

15. The apparatus of claim 11, wherein as the touch moves, when channel information corresponding to two or more contact panels in the contact region are simultaneously acquired, the channel information manager selects channel information corresponding to one of a contact panel having the largest intensity of touch sensitivity and a contact panel having the earliest touch sensing time.

16. The apparatus of claim 11, wherein the acquiring unit judges whether a contact panel corresponding to the first channel information and a contact panel corresponding to the second channel information are physically adjacent to each other and only when the contact panels are physically adjacent to each other according to judging whether the contact panels are physically adjacent to each other, the channel information manager converts the channel information into the order information.

17. The apparatus of claim 11, wherein the channel information manager converts each of the first channel information and the second channel information into the order information by using order table information in which orders are sequentially granted to a plurality of contact panels constituting the contact region.

18. The apparatus of claim 17, further comprising:

a setting unit setting a contact panel activated to sense movement of a touch among the plurality of contact panels, wherein only when the first channel information and the second channel information correspond to the activated contact panel, the channel information manager converts the channel information into the order information.

19. The apparatus of claim 17, wherein the clock signal generator calculates a movement distance of the touch on the basis of the order information, and outputs the movement distance clocks signal only when the movement distance is less than a predetermined reference value.

20. The apparatus of claim 11, wherein the clock signal generator judges whether the movement distance of the touch is larger than a reference value, and only when the movement distance is less than the reference value according to the judgment result, outputs the movement distance clock signal on the basis of the difference between the order information stored in the first ring buffer and the order information stored in the second ring buffer.

21. The apparatus of claim 11, wherein the contact region has any one of a ring shape, a straight-line shape, a curved shape, an oval shape, and a circular shape.

22. The apparatus of claim 11, further comprising:

a plurality of capacitances storing electric charges that flows for each of channels corresponding to the plurality of contact panels included in the contact region, wherein a clock value of a digital signal generated by variation of an electrostatic capacity stored in the capacitance is counted and the electrostatic capacity of the capacitance is calculated by using the counted clock value.

* * * * *